US010747960B2

(12) United States Patent
Venkataraman et al.

(10) Patent No.: US 10,747,960 B2
(45) Date of Patent: *Aug. 18, 2020

(54) SYSTEMS AND METHODS FOR TRAINING A MODEL TO DETERMINE WHETHER A QUERY WITH MULTIPLE SEGMENTS COMPRISES MULTIPLE DISTINCT COMMANDS OR A COMBINED COMMAND

(71) Applicant: Rovi Guides, Inc., San Jose, CA (US)

(72) Inventors: Sashikumar Venkataraman, Andover, MA (US); Ahmed Nizam Mohaideen P, Kovilpatti (IN); Manik Malhotra, Bengaluru KA (IN)

(73) Assignee: ROVI GUIDES, INC., San Jose, CA (US)

( * ) Notice: Subject to any disclaimer, the term of this patent is extended or adjusted under 35 U.S.C. 154(b) by 35 days.

This patent is subject to a terminal disclaimer.

(21) Appl. No.: 16/158,247

(22) Filed: Oct. 11, 2018

(65) Prior Publication Data

US 2019/0155901 A1    May 23, 2019

Related U.S. Application Data

(63) Continuation of application No. 15/055,868, filed on Feb. 29, 2016, now Pat. No. 10,133,735.

(51) Int. Cl.
*G06F 17/28* (2006.01)
*G06F 40/35* (2020.01)
(Continued)

(52) U.S. Cl.
CPC .......... *G06F 40/35* (2020.01); *G06F 16/2455* (2019.01); *G06F 40/211* (2020.01);
(Continued)

(58) Field of Classification Search
CPC .... G06F 40/211; G06F 40/247; G06F 40/268; G06F 40/253; G06F 40/284; G06F 40/30; G06F 40/55; G06F 40/37; G06F 40/58; G06F 40/45; G06F 3/16; G06F 17/30616; G06F 17/30684; G06F 17/30696; G06F 17/28; G06F 17/2809; G06F 17/2827;
(Continued)

(56) References Cited

U.S. PATENT DOCUMENTS 5,640,490 A *  6/1997  Hansen ................... G10L 15/02
                                                       704/254
5,873,062 A *  2/1999  Hansen ................... G10L 15/02
                                                       704/251

(Continued)

*Primary Examiner* — Vijay B Chawan
(74) *Attorney, Agent, or Firm* — Haley Guiliano LLP

(57) ABSTRACT

Systems and methods are disclosed herein for training a model to accurately determine whether two phrases are conversationally connected. A media guidance application may detect a first phrase and a second phrase, translate each phrase to a string of word types, append each string to the back of a prior string to create a combined string, determine a degree to which any of the individual strings, matches any singleton template, and determine a degree to which the combined string matches any conversational template. Based on the degrees to which the individual and combination strings match the singleton and conversational templates, respectively, strengths of association are correspondingly updated.

20 Claims, 8 Drawing Sheets

(51) Int. Cl.
*G06F 16/2455* (2019.01)
*G06F 40/30* (2020.01)
*G06F 40/211* (2020.01)
*G06F 40/247* (2020.01)
*G10L 15/22* (2006.01)
*G10L 15/06* (2013.01)

(52) U.S. Cl.
CPC ............ *G06F 40/247* (2020.01); *G06F 40/30* (2020.01); *G10L 15/22* (2013.01); *G10L 15/063* (2013.01)

(58) Field of Classification Search
CPC ............... G06F 17/2836; G06F 17/289; G06F 17/30011; G10L 15/02; G10L 15/063; G10L 15/08; G10L 15/187; G10L 15/1822; G10L 15/183; G10L 15/19; G10L 15/265; G10L 15/193; G10L 17/26; G10L 15/22; G10L 15/30
USPC ......... 370/335, 320, 130; 375/152; 714/721; 365/189.05, 185.22; 707/739, 999.005, 707/999.102; 704/254, 257, 9, 3, 4, 704/270.1, 275, 270, 251, 255
See application file for complete search history.

(56) References Cited

U.S. PATENT DOCUMENTS

| | | | | |
|---|---|---|---|---|
| 8,880,389 | B2* | 11/2014 | Iofinov | G06F 17/2785 704/9 |
| 9,720,904 | B2* | 8/2017 | Ikawa et al. | G10L 15/063 |
| 10,133,735 | B2* | 11/2018 | Venkataraman | G06F 17/279 |
| 10,311,479 | B2* | 6/2019 | Park | G06F 16/285 |
| 10,496,225 | B2* | 12/2019 | Jung | G06F 3/0488 |
| 2008/0097742 | A1* | 4/2008 | Ushioda | G06F 17/2827 704/3 |
| 2009/0063550 | A1* | 3/2009 | Van Den Berg | G06F 16/338 |
| 2009/0070322 | A1* | 3/2009 | Salvetti | G06F 16/3334 |
| 2011/0202334 | A1* | 8/2011 | Abir | G06F 17/2809 704/4 |
| 2013/0262080 | A1* | 10/2013 | Marciano | G06F 17/2836 704/3 |
| 2015/0019558 | A1* | 1/2015 | Crouch | G06F 16/35 707/739 |

* cited by examiner

SYSTEMS AND METHODS FOR TRAINING A MODEL TO DETERMINE WHETHER A QUERY WITH MULTIPLE SEGMENTS COMPRISES MULTIPLE DISTINCT COMMANDS OR A COMBINED COMMAND

CROSS-REFERENCE TO RELATED APPLICATIONS

This application is a continuation of U.S. patent application Ser. No. 15/055,868, filed Feb. 29, 2016, the content of which is hereby incorporated by reference herein in its entirety.

BACKGROUND

It is becoming ubiquitous, for searches to be carried out by devices that detect a voice or textual input. For example, if a user types out the phrase "show me a list of action movies" into a search engine, a search might be performed for a list of action movies. These devices, however, are not able to effectively distinguish between where one search string ends, and a next search string begins. For example, devices are not able to effectively discern that the string "Show me a list of action movies. What is the weather?" includes two separate search commands.

SUMMARY

Systems and methods are provided herein for training a model to accurately determine whether two phrases are conversationally connected. For example, if the search string "Show me a list of action movies. What is the weather?" is input by a user, the systems and methods described herein may resolve that two separate commands of "Show me a list of action movies" and "What is the weather?" have been input, and may feed back this resolution to a model for the model to more accurately identify whether strings include one or more commands.

In some aspects of the disclosure, a media guidance application that is executed by control circuitry of user equipment may detect a first phrase and a second phrase. The media guidance application may detect the first phrase and the second phrase through any known user input interface of a user equipment (described further below with respect to FIG. 4), such as a microphone if the phrases were spoken, or a keyboard or touch screen if the phrases were typed. The detection of the first phrase and the second phrase may be detected even if both phrases are input through a single Search command. Any known means of natural language processing may be used to distinguish between the first and second phrase. Natural language processing is further discussed in U.S. patent application Ser. No. 14/728,702, filed Jun. 2, 2015, presently pending, the contents of which are hereby incorporated by reference herein in their entirety. As a non-limiting example, if a user types "show me action movies with Tom Cruise," the media guidance application may detect that the conjunction or transitional word of "with" indicates a second phrase, such that "show me action movies" is the first phrase, and "With Tom Cruise" is the second phrase.

In some embodiments, the media guidance application may translate the first phrase to a first string of word types by determining what type of word each word of the first phrase represents, and may replace each word of the first phrase with its respective type. Similarly, the media guidance application may translate the second phrase to a second string of word types by determining what type of word each word of the second phrase represents, and may replace each word of the second phrase with its respective type.

The media guidance application may perform the translation of either the first phrase or the second phrase by first extracting a word from either the first phrase or the second phrase. For example, the media guidance application may extract words (or terms including multiple words) individually from the command "show me action movies with Tom Cruise."

After extracting the words, the media guidance application may compare a given word (or multi-word term) to entries of a database that indicates word types of known words (or term, types of known terms). For example, the term "show me" may be translated to the type "command" because entries of a database associate the term "show me" with a command. Similarly, the media guidance application may translate the word "action" to the type "genre" based on indicia of an entry of the database, may translate "movie" to "media category" because movie is a type of media category, and may translate "Tom Cruise" to the type "crew" because an entry of the database indicates that Tom Cruise was an actor who starred in the crew of a movie. In some embodiments, however, a word type may not be known for a given word. For example, if an up-and-coming actor who is not well known is searched for, and that actor's name is extracted and then compared to entries of the database, the database may have no entry corresponding to that name.

The media guidance application may then determine whether a word type is known based on the comparing. This determination may be made based on whether an entry exists for a given word in the database. In response to determining that the word type is known, the media guidance application may replace the word with the word type indicated in an entry corresponding with the word. Thus, following translation of the first phrase "Show me action Movie," a string may be generated of just word types that says 'command' 'genre' 'media category.' The second phrase may be translated to the string: 'transitional word' 'crew.'

As described above, a word type for a given word may be unknown. Thus, the media guidance application may, in response to determining that a word type is unknown, compare the word to entries of a dictionary database to determine a grammatical category of the word. For example, the term "movie" may be determined by the media guidance application to be of the grammatical category of "noun." The media guidance application may additionally compare the word to entries of a graph to determine a high-level category corresponding to the word. For example, the media guidance application may determine that the term "movie" belongs to the high-level category "media category" based on the comparison to the graph. The media guidance application may then extrapolate a word type based on the grammatical category and the high-level category. For example, the media guidance application, having determined that the word is a noun and is associated with a "media category" corresponds to the type: "media category." Graphs (interchangeably referred to as "knowledge graphs" herein) are described further in U.S. patent application Ser. No. 14/501,504, filed Sep. 30, 2014, U.S. patent application Ser. No. 14/500,309, filed Sep. 29, 2014, and U.S. patent application Ser. No. 14/448,308, filed Jul. 31, 2014, which are hereby incorporated by reference herein in their entireties.

In some embodiments, the media guidance application may generate a third string of word types by appending the second string to the end of the first string. For example, as was described in the above example, the first string may be:

'command' 'genre' 'media category,' and the second string may be: 'transitional word' 'crew'. Thus, the media guidance application may generate a third string: 'command' 'genre' 'media category' 'transitional word' 'crew' by appending the second string of word types to the second string of word types.

The media guidance application may determine a first degree to which the first string and the second string matches any singleton template of a plurality of singleton templates by comparing both the first string and the second string to the plurality of singleton templates. As will be described in more detail below, a singleton template is a template for a string of word types associated with a single command. In some embodiments, each singleton template represents a template of word types that represent a valid search query that requires no further input to be executed. For example, if string of word types that does not have a transitional word, such as the word "with," within it, then the string likely can be executed without additional input, and is likely to match a singleton template.

The media guidance application may additionally determine a second degree to which the third String matches any conversational template of a plurality of conversational templates. As will be described in more detail below, a conversational template is a template for a string of word types associated with two or more commands.

In some embodiments, the media guidance application may determine whether the first degree exceeds the second degree. In other words, the media guidance application may determine whether the first string and the second string strongly correspond to a template for single commands, and may also determine whether the combined strings (i.e., the third string) corresponds strongly to a template for double commands. In response to determining that the first degree exceeds the second degree (e.g., the first string and second string strongly correspond to single, individual commands), the media guidance application may decrease a strength of association between the first string and a conversational category, and may decrease a strength of association between the second string and the conversational category. The net effect of this is that, if the model is relied upon to resolve similar search strings, a graph will now indicate that the first string and the second string are likely individual commands. Furthermore, the media guidance application may proceed to execute a first search corresponding to the first phrase, and to execute a second, separate search corresponding to the second phrase.

In some embodiments, in response to determining that the second degree exceeds the first degree, the media guidance application may increase the strength of association between the first string and the conversational category, and may also increase the strength of association between the second string and, the conversational category. The net effect of this is that, if the model is relied upon to resolve similar search strings, a graph will now indicate that the first string and the second string are likely a combined, single command. Furthermore, the media guidance application may now create a combined phrase by combining the first phrase with the second phrase, and may then execute a search on the combined phrase.

In some embodiments, the media guidance application may access a graph that indicates expected importance levels of word types. For example, a search string may include a word that is more important than other words. The media guidance application may compare each word, type of the first string to the graph to determine a respective, expected importance level, and may identify a predominant, word type based on a highest determined respected importance level corresponding to a respective word type of the first string. As an example, the word typo string 'command' 'genre' 'media category,' for example, contains the word type 'media category.' The media guidance application may determine that the word type "media category" is the predominant word type of this string based on data of the graph.

In some embodiments, the media guidance application may determine, based on the predominant word type of the first string, a string type, and May increase a strength of association between the first string and the string type. Thus, following from the example above, the word type string of 'command' 'genre' 'media category' may have a predominant word type of 'media category.' Thus, a strength of association between the word type string of 'command' 'genre' and 'media category' and the string type of "a command to search for media of a media category" may be increased. This may help train the model such that, next time a similar search string is detected by the media guidance application, the media guidance application may more quickly resolve that the conversational category of the command is likely a search for a media of a specified category.

In some embodiments, the media guidance application may detect the second phrase subsequent to a time at which the media guidance application detects the first phrase. The media guidance application may, when determining the first degree in this scenario, determine whether a word type of a first word of the second string is of a transitional type, and, in response to determining that the word type of the first word of the second string is of the transitional type, the media guidance application may reduce the first degree. In other words, some word types strongly indicate that a preceding string is part of a combined search string, or a "conversation." Transitional word types in particular indicate that a preceding string is part of a conversation because strings that begin with a transitional word type cannot stand alone, and must connect to a preceding command. In some embodiments, the media guidance application may additionally increase the second degree in response to determining that the word type of the first word of the second string is of the transitional type, for the same reasons as it would decrease the first degree.

In some aspects, systems and methods are provided for using a trained knowledge graph (e.g., as trained using the above systems and methods) to accurately determine whether two phrases are conversationally connected. To this end, in some embodiments, the media guidance application may receive a first phrase, a second phrase, and a third phrase. The phrases may be received through mechanisms described above and below.

In some embodiments, the media guidance application may translate the first phrase to a first string of word types by determining what type of word each word of the first phrase represents, and replace each word of the first phrase with its respective type. Similarly, the media guidance application may translate the second phrase to a second string of word types by determining what type of word each word of the second phrase represents, and by replacing each word of the second phrase with its respective type, and may also translate the third phrase to a third string of word types by determining what type of word each word of the third phrase represents, and by replacing each word of the third phrase with its respective type. The media guidance application may accomplish these ends through any means described above and below.

In some embodiments, the media guidance application may access a knowledge graph to determine a first strength of association between a combination of the first string and the second string and any Conversational category of a plurality of conversational categories, and a second strength of association between a combination of the second string and the third string and any conversational category of the plurality of conversational categories. The first and second strength of association may be calculated in any manner described above and below.

In some embodiments, the media guidance application may determine whether any of the first strength of association and the second strength of association exceed a threshold, and, may responsive to this determining, may make a determination as to which strings, if any, are part of a conversation. For example, if both the first strength of association and the second strength of association exceed the threshold, the media guidance application may determine, that each of the first string, the second string, and the third string are part of a first conversation. If the first strength of association exceeds the threshold, but the second strength of association does not exceed the threshold, the media guidance application may determine that the first string and the second string are part of a second conversation that the third string is not a part of. Likewise, if the second strength of association exceeds the threshold, but the first strength of association does not exceed the threshold, the media guidance application may determine that the second string and the third string are part of a third conversation that the first string is not a part of. The meaning of what it means to be part of a conversation is described above and below.

In some embodiments, if both the first strength of association and the second strength of association exceed the threshold, the media guidance. Application may execute a search relating to the first conversation. Further, if the first strength of association exceeds the threshold, but the second strength of association does not exceed the threshold, the media guidance application may execute a search relating to the second conversation. Additionally, if the second strength of association exceeds the threshold, but the first strength of association does not exceed the threshold, the media guidance application may execute a search relating to the third conversation. Executing a search is described above and below.

In some embodiments, the media guidance application may generate for display a query corresponding to the executed search. The media guidance application may then receive feedback from a user that indicates that the query, does not accurately represent an intended search of the user, and, in response to receiving the feedback, the media guidance application may update the knowledge graph according to the feedback. Thus, in future searches, the feedback will be used to perform a more accurate search.

In some embodiments, the media guidance application may determine that none of the first strength of association and the second strength of association exceed the threshold. The media guidance application may proceed to prompt a user for feedback as to whether the desired search query matches the combination of the first string and the second string, or the combination of the second string and the third string. In response to receiving feedback that the desired search query was the combination of the first string and the second string, the media guidance application may increase the strength of association between the combination of the first string and the second string and a corresponding closest conversational category to a first value that is at least as high as the threshold value, and, in response to receiving feedback that the desired search query was the combination of the second string and the third string, the media guidance application may increase the strength of association between the combination of the second string and the third string and a corresponding closest conversational category to a second value that is at least as high as the threshold value. Further, in response to receiving feedback that the desired search query does not match either of the combination of the first string and the second string, or the combination of the second string and the third string, the media guidance application may increase a strength of association between each of the first string, the second string, and the third string with a singleton category in the knowledge graph. This will further improve the knowledge graph's associations for further searches.

In some embodiments, each conversational category of the plurality of conversational categories represents a conversation formed by an amalgamation of at least two strings that each, individually, match a respective singleton template. The media guidance application may thus determine that the matching singleton templates, when juxtaposed, are determined to form a single query. This determination may also be used to update the knowledge graph. In some embodiments, the first string, the second string, and the third string may form a single query as well, and thus the first conversation, the second conversation, and the third conversation form the single query based on a respective juxtaposition of the first string, the second string, and the third string.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Systems and methods are provided herein for training a model to accurately determine whether two phrases are conversationally connected. For example, if the search string "show me a list of action movies. what is the weather?" is input by a user, the systems and methods described herein may resolve that two separate commands of "show me a list of action movies" and "what is the weather?" have been input, and may feed back this resolution to a model for the model to more accurately identify whether strings include one or more commands.

Figure 1:
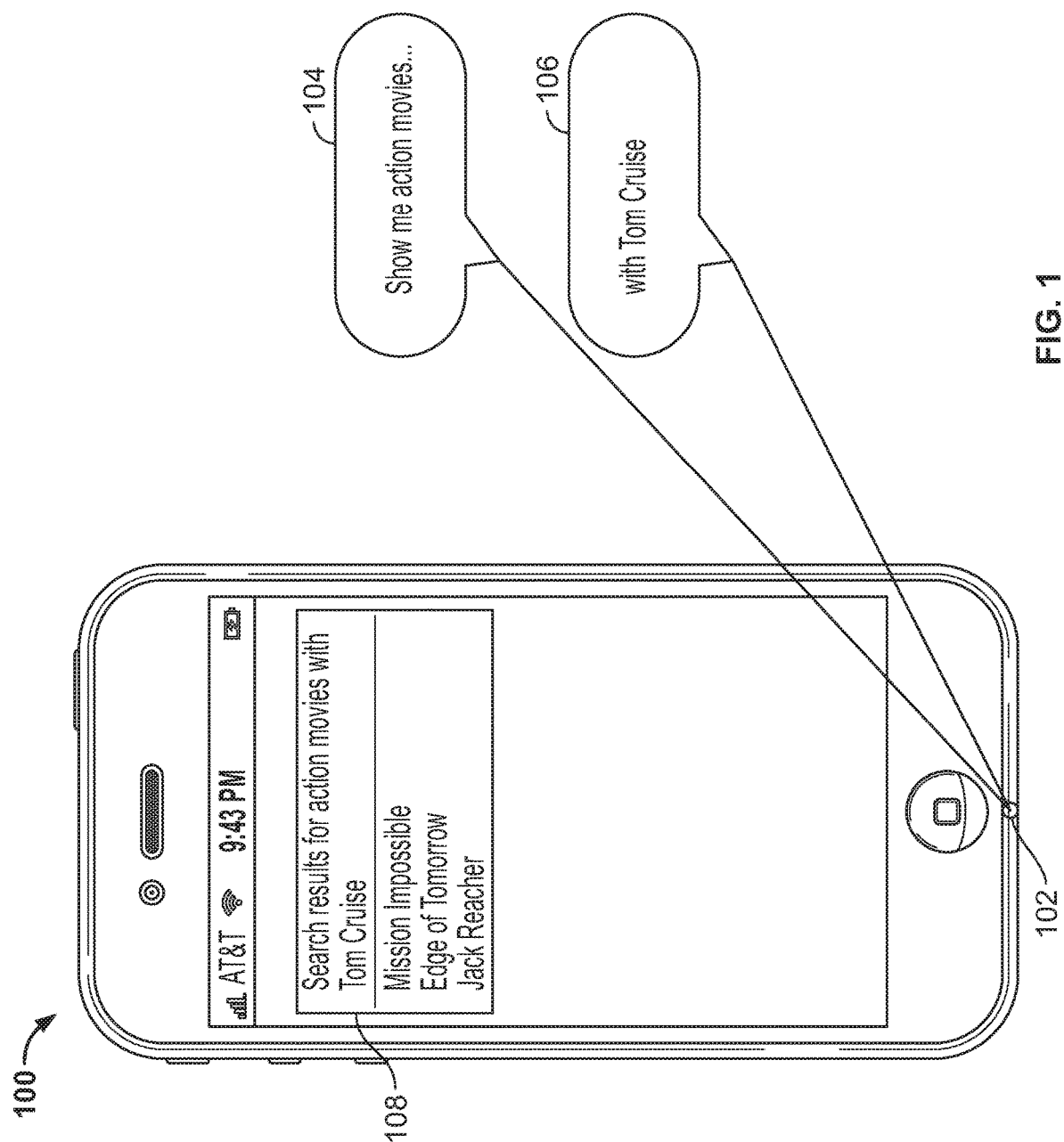
FIG. 1 depicts a user equipment that may determine whether multiple commands are part of the same conversation, or are separate, isolated commands, in accordance with some embodiments of the disclosure.

FIG. 1 depicts a user equipment that may determine whether multiple commands are part of the same conversation, or are separate, isolated commands, in accordance with some embodiments of the disclosure. In some aspects of the disclosure, a media guidance application that is executed by control circuitry of user equipment 100 may detect a first phrase 104 and a second phrase 106. The media guidance application, control circuitry, and user equipment 100 are all described further below with respect to FIGS. 4 and 5.

In some embodiments, the media guidance application may detect first phrase 104 and the second phrase 106 through any known user input interface of a user equipment (described further below with respect to FIG. 4), such as a microphone (e.g., microphone 102) if the phrases were spoken, or a keyboard or touch screen if the phrases were typed. The media guidance application may be, commanded to listen for the first phrase and the second phrase (e.g., by a user initiating a search application). Alternatively or additionally, the media guidance application may passively listen for phrases during routine activity, such as listening for phrases in social media chatter or messages between users, in order to reactively output, information relating to what a user is doing.

In some embodiments, the media guidance application may detect both first phrase 104 and second phrase 106 even if both phrases are input through a single search command. As discussed above, any known means of natural language processing may be used to distinguish between the first and second phrase, such as the natural language processing techniques described above. As a non-limiting example, if a user types "show me action movies with Tom Cruise," the media guidance application may detect that the conjunction of "with" indicates a second phrase, such that "show me action movies" is the first phrase, and "with Tom Cruise" is the second phrase.

In some embodiments, the media guidance application may translate first phrase 104 to a first string of word types by determining what type of word each Word of the first phrase represents, and may replace each word of first phrase 104 with its respective type. Similarly, the media guidance application may translate second phrase 106 to a second string of word types by determining what type of word each word of second phrase 106 represents, and may replace each word of the second phrase with its respective type. In some embodiments, the media guidance application may perform the translation of either first phrase 104 or second phrase 106 by first extracting a word from either first phrase 104 or second phrase 106. For example, the media guidance application may extract words terms including multiple words) individually from the command "show me action movies with Tom Cruise." While the disclosure describes processing of phrases by use of processing "words," the term "word" and "term" carry the same effect and meaning, and processing described with respect to an individual "word" may equally be carried to a "term" that includes multiple words, but carries its own known definition. For example, the phrase "Tom Cruise" is a term, because it refers to one known entity—namely, the actor, Tom Cruise.

In some embodiments, after extracting the words, the media guidance application may compare a given word (or multi-word term) to entries of a database that indicates word types of known words (or term types of known terms). The database may be a media-guidance data source, which is a specialized database described below with respect to FIG. 4, or the database may be any other known type of database. The database may be located locally, such as at local storage or memory of the user equipment, or it may be located remotely, and thus accessible by way of a communications network. Each type of storage and the manner in which storage may occur is described below with respect to FIGS. 3 and 4.

As an example of the comparing, the media guidance application may compare the term "show me" to entries of the database. The database may indicate that the term "show me" is a 'command.' Thus, the term "show me" may be translated to the type 'command.' Similarly, the media guidance application may translate "action" to the type 'genre' based on indicia of an entry of the database, may translate "movie" to 'media category' because "movie" is a type of 'media category,' and may translate "Tom Cruise" to the type 'crew' because an entry of the database indicates that Tom Cruise was an actor who starred in the crew of a movie.

In some embodiments, the media guidance application may determine that a word type is not known for a given word. This determination may be made, for example, if the database does not have an entry that associates the word to a word type. For example, if an up-and-coming actor who is not well known is searched for, and that actor's name is extracted and, then compared to entries of the database, the database may have no entry corresponding to that name.

In some embodiments, the media guidance application may determine whether a word type is known based on the comparing. For example, as described above, the media guidance application may determine that a word type is known if an entry that corresponds a word to a word type exists in the database. Similarly, the media guidance application may determine that a word type is unknown if the database does not have an entry that corresponds a word to a word type. In response to determining that the word type is known, the media guidance application may replace the word with the word type indicated in an entry corresponding with the Word. Thus, following translation of first phrase 104 "Show me action movie," a string may be generated of just word types that says 'command' 'genre' 'media category.' Second phrase 106 may be translated, to the string; 'transitional word' 'crew.'

In some embodiments, when a word type for a given word is unknown, the media guidance application may, in response to determining that a word type is unknown, compare the word to entries of a dictionary database to determine a grammatical category of the word. The dictionary database may be a same database or a different database as the database described above that corresponds words to word types. The dictionary database may carry any characteristic described above with respect to the database described above that corresponds words to word types. As an example of determining grammatical categories of a word, the term "movie" may be determined by the media guidance application to be of the grammatical category of "noun."

In some embodiments, the media guidance application may additionally compare the word to entries of a graph to determine a high-level Category corresponding to the word. The term "graph," as used herein, is a database that corresponds data (e.g., word types) to strength of association between that data and other data. For example, the media guidance application may determine that the term "movie" could potentially correspond to any of the high-level categories of "media category," "media that lasts longer than one hour," "video media," and the like. The graph may indicate a highest degree of correlation between "Movie" and "media category," and thus "media category" may be chosen based on the comparison to the graph.

In some embodiments, the media guidance application may then extrapolate a word type based on the grammatical category and the high-level category. For example, the media guidance application, having determined that the word is a noun and is associated with a "media category" corresponds to the type: "media category." As is plain from this example, the grammatical category sometimes will not affect the media guidance application's determination of type. Thus, it may be optional whether to consider the grammatical category.

In some embodiments, the media guidance application may generate a third string of word types by appending second string 106 to the end of first string 104. For example, as was described in the above example, the first string may be 'command' 'genre' 'media category', and the second string may be: 'transitional word' 'crew'. Thus, the media guidance application may generate a third string: 'command' 'genre' 'media category' 'transitional word' 'crew' by appending the second string of word types to the second string of word types.

In some embodiments, the media guidance application may determine a first degree to which the first string and the second string matches any singleton template of a plurality of singleton templates by comparing both the first string and the second string to the plurality of singleton templates. By way of definition, the term "template" as used in this disclosure means a string of words or word types that corresponds to a category. One type of category is a "singleton template," which is a template for a string of words or word types associated with a single command. Another type of category is a "conversational template," which is a template for a string of words or word types associated with two or more commands.

In some embodiments, each singleton template represents a template of word types that represent a valid search query that requires no further input to be executed. For example, if string of word types that does not have a transitional word, such as the word "with," within it, then the string likely can be executed without additional input, and is likely to match a singleton template. There are, however, scenarios where one phrase matches a singleton template, but another does not—such as a second phrase that has the word "with" its first word. In such a scenario, while the first phrase may match a singleton template, the first phrase may better match a conversational template when considered in conjunction with the second phrase.

In some embodiments, the media guidance application may additionally determine a second degree to which the third string matches any conversational template of a plurality of conversational templates. The media guidance application may determine whether the first degree exceeds the second degree. In other words, the media guidance application may determine whether the first string and the second string strongly correspond to templates for single commands, and may also determine whether the combined strings (i.e., the third string) corresponds strongly to a template for double commands.

In response to determining that the first degree exceeds the second degree (e.g., the first string and second string strongly correspond to single, individual commands), the media guidance application may decrease a strength of association between the first string and a conversational category, and may decrease a strength of association between the second string and the conversational category. The media guidance application may decrease these strength of association in a graph that maintains strength of association between various conversational categories and strings of words or word types. The net effect of this is that, if the model is relied upon to resolve similar search strings in the future, a graph will now indicate that the first string and the second string are likely individual commands.

In some embodiments, after resolving that the first degree exceeds the second degree, the media guidance application may proceed to execute a first search corresponding first phrase 104, and to execute a second, separate search corresponding to second phrase 106. The search results may separately populate in search results 108, which may be generated for display through a display of user equipment 100. The display will be described below with respect to FIG. 4. Additionally, or alternatively, the search results may be output verbally through speakers that are incorporated in, or connected to, user equipment 100. The speakers will be described below with respect to FIG. 4.

In some embodiments, in response to determining that the second degree exceeds the first degree, the media guidance application may increase the strength of association between the first string and the conversational category, and may also increase the strength of association between the second string and the conversational category. Similar to the above, this may be performed by instructing a graph to increment the above-described strengths of associations. The net effect of this is that, if the model is relied upon to resolve similar search strings, a graph will now indicate that the first string and the second string are likely a combined, single command.

In some embodiments, in response to determining that the second degree exceeds the first degree, the media guidance application may create a combined phrase by combining first phrase 104 with second phrase 106, and may then execute a search on the combined phrase. The results may be output in any manner described above and below, such as in search results 108 depicted in FIG. 1.

In some embodiments, the media guidance application may access a graph that indicates expected importance levels of word types. The graph may be accessed through any database access mechanism described above and below. For example, a search string may include a word that is more important than other words. The media guidance application may compare each word type of the first string to the graph to determine a respective expected importance level. This may be performed in any manner described above and below, such as comparing the word type to entries of the graph to find a matching graph entry that indicates an importance level of the word type. The media guidance application may then identify a predominant word type based on a highest determined respected importance level corresponding to a respective word type of the first string. As an example, the word type string 'command' 'genre' 'media category,' for example, contains the word type 'media category.' The media guidance application may determine that the word type "media category" is the predominant word type of this string based on data of the graph.

In some embodiments, the media guidance application may determine, based on the predominant word type of the first string, a string type, and may increase a strength of association between the first string and the string type. Thus, following from the example above, the word type string of 'command' 'genre' 'media category' may have a predominant word type of 'media category.' Thus, a strength of association between the word type string of 'command' 'genre' and 'media category' and the string type of "a command to search for media of a media category" may be increased. This may help train the model such that, next time a similar search string is detected by the media guidance application, the media guidance application may more quickly resolve that the conversational category of the command is likely a search for a media of a specified category.

In some embodiments, the media guidance application may detect the second phrase subsequent to a time at which the media guidance application detects the first phrase. The media guidance application may, when determining the first degree in this scenario, determine whether a word type of a first word of the second string is of a transitional type, and, in response to determining that the word type of the first word of the second string is of the transitional type, the media guidance application may reduce the first degree. As an example, the media guidance application may determine whether the first word of the second string is of the transitional type by learning its grammatical category by consulting a dictionary database, in any manner described above or below. In other words, some word types strongly indicate that a preceding string is part of a combined search string, or a "conversation." Transitional word types in particular indicate to the media guidance application that a preceding string is part of a conversation because strings that begin with a transitional word type cannot stand alone, and must connect to a preceding command. In some embodiments, the media guidance application may additionally increase the second degree in response to determining that the word type of the first word of the second string is of the transitional type, for the same reasons as it would decrease the first degree.

In some aspects, systems and methods are provided for using a trained knowledge graph (e.g., as trained using the above systems and methods) to accurately determine whether two phrases are conversationally connected. To this end, in some embodiments, the media guidance application may receive a first phrase, a second phrase, and a third phrase. The phrases may be received through mechanisms described above and below. As an example, following from FIG. 1, the first phrase may be first phrase 104 (e.g., "Show me action movies"), the second phrase may be second phrase 106 (e.g., "with Tom Cruise"), and the third phrase (not depicted in FIG. 1) may be any phrase, such as "and Paula Patton." Paula Patton is an actress who co-starred with Tom Cruise in the movie "Mission Impossible: Ghost Protocol."

In some embodiments, the media guidance application may translate the first phrase to a first string of word, types by determining what type of word each word of the first phrase represents, and replace each word of the first phrase with its respective type. Similarly, the media guidance application may translate the second phrase to a second string of word types by determining what type of word each word of the second phrase represents, and by replacing each word of the second phrase with its respective type, and may also translate the third phrase to a third string of word types by determining what type of word each word of the third phrase represents, and by replacing each word of the third phrase with its respective type. The media guidance application may accomplish these ends through any means described above and below. As described above and below, first phrase 104 may be translated to 'command' 'genre' 'media category,' and second phrase 104 may be translated to 'transitional word' 'crew.' Similarly, the third phrase, following the example above, may be translated to 'transitional word' 'crew.'

In some embodiments, the media guidance application may access a knowledge graph to determine a first strength of association between a combination of the first string and the second string and any conversational category of a plurality of conversational categories, and a second strength of association between a combination of the second string and the third string and any conversational category of the plurality of conversational categories. The knowledge graph may be accessed by any means described above and below. The first and second strength of association may be calculated in any manner described above and below. In essence, the media guidance application, by using this step, seeks to determine whether any conversational category at all matches the combination of the first string and the second string. If any conversational category matches—regardless of which category it is—then the media guidance application may determine from that fact that the corresponding strings are intended to form one single conversation.

In some embodiments, the media guidance application may determine whether any of the first strength of association and the second strength of association exceed a threshold, and, may responsive to this determining, may make a determination as to which strings, if any, are part of a conversation. The threshold may be a static number that constitutes a sufficient strength of association to conclude that two or more templates are part of a conversation. Alternatively the threshold may be a dynamic threshold that is updated as the knowledge graph is updated. As an example, if a sufficient number of strengths of association are high enough, or a high level of confidence is desired, the threshold may be raised correspondingly. The threshold may be changed either based on an algorithm corresponding to how high the strengths of association of the knowledge graph become, or manually by an editor. In some embodiments, if both the first strength of association and the second strength of association exceed the threshold, the media guidance application may determine that each of the first string, the second string, and the third string are part of a first conversation. If the first strength of association exceeds the threshold, but the second strength of association does not exceed the threshold, the media guidance application may determine that the first string and the second string are part of a second conversation that the third string is not a part of. Likewise, if the second strength of association exceeds the threshold, but the first strength of association does not exceed the threshold, the media guidance application may determine that the second string and the third string are part of a third conversation that the first string is not a part of. The meaning of what it means to be part of a conversation is described above and below.

In some embodiments, if both the first strength of association and the second strength of association exceed the threshold, the media guidance application may execute a search relating to the first conversation. Further, if the first strength of association exceeds the threshold, but the second strength of association does not exceed the threshold, the media guidance application may execute a search relating to the second conversation. Additionally, if the second strength of association exceeds the threshold, but the first strength of association does not exceed the threshold, the media guidance application may execute a search relating to the third conversation. Executing a search according to a conversation is described above and below. In the example from above, the first conversation may be the entirety of the first phrase, the second phrase, and the third phrase, and thus the search performed may be "Show me action movies with Tom Cruise and Paula Patton." The second conversation might solely be "Show me action movies with Tom Cruise."

In some embodiments, the media guidance application may generate for display a query corresponding to the executed search. For example, the media guidance application may generate for display a query that says "Did you mean to say 'Show me action movies with Tom Cruise and Paula Patton'?" The media guidance application may then receive feedback from a user that indicates that the query does not accurately represent an intended search of the user, and, in response to receiving the feedback, the media guidance application may update the knowledge graph according to the feedback. The feedback may be the user indicating he meant to separately search for action movies with Tom Cruise, and action movies with Paula Patton, but not search for action movies that necessarily star both actors. The knowledge graph may be updated to increase and decrease strengths of association accordingly.

In some embodiments, the media guidance application may determine that none of the first strength of association and the second strength of association exceed the threshold. Similar to the foregoing, the media guidance application may proceed to prompt a user for feedback as to whether the desired search query matches the combination of the first string and the second string, or the combination of the second string and the third string. In response to receiving feedback that the desired search query was the combination of the first string and the second string, the media guidance application may increase the strength of association between the combination of the first string and the second string and a corresponding closest conversational category to a first value that is at least as high as the threshold value, and, in response to receiving feedback that the desired search query was the combination of the second string and the third string, the media guidance application may increase the strength of association between the combination of the second string and the third string and a corresponding closest conversational category to a second value that is at least as high as the threshold value. Further, in response to receiving feedback that the desired search query does not match either of the combination of the first string and the second string, or the combination of the second string and the third string, the media guidance application may increase a strength of association between each of the first string, the second string, and the third string with a singleton category in the knowledge graph. This will further improve the knowledge graph's associations for further searches by indicating that the phrases should in the future be searched separately.

In some embodiments, each conversational category of the plurality of conversational categories represents a conversation formed by an amalgamation of at least two strings that each, individually, match a respective singleton template. For example, if first phrase 104 said "What is the time?" and second phrase 106 said "Where is the nearest coffee shop at this time," the media guidance application may thus determine that the matching singleton templates, when juxtaposed, are determined to form a single query. This determination may also be used to update the knowledge graph. In some embodiments, the first string, the second string, and the third string may form a single query as well, and thus the first conversation, the second conversation, and the third conversation form the single query based on a respective juxtaposition of the first string, the second string, and the third string.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a, hand-held computer, a stationary telephone, a personal digital assistant (PDA), a mobile telephone, a portable video, player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should, be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections.

Figure 2:
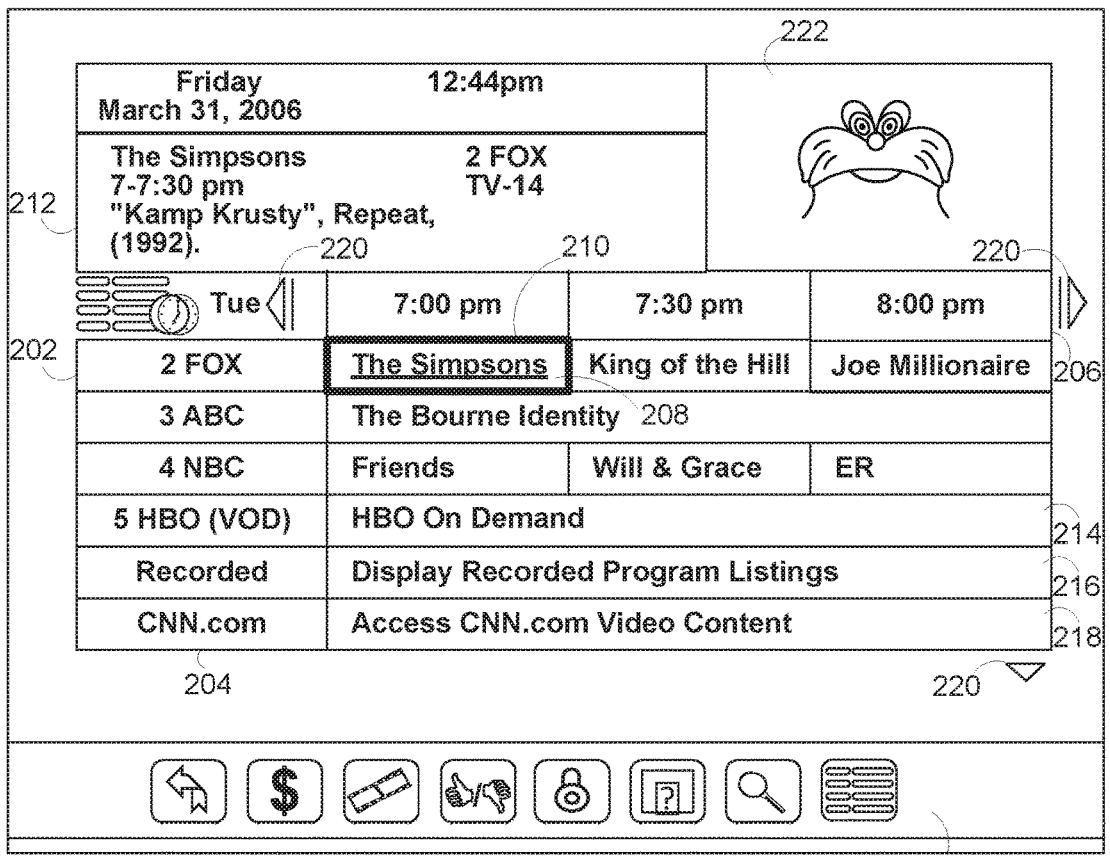
FIG. 2 shows an illustrative embodiment of a display screen that may be used to provide media guidance application listings and other media guidance information, in accordance with some embodiments of the disclosure.
Figure 3:
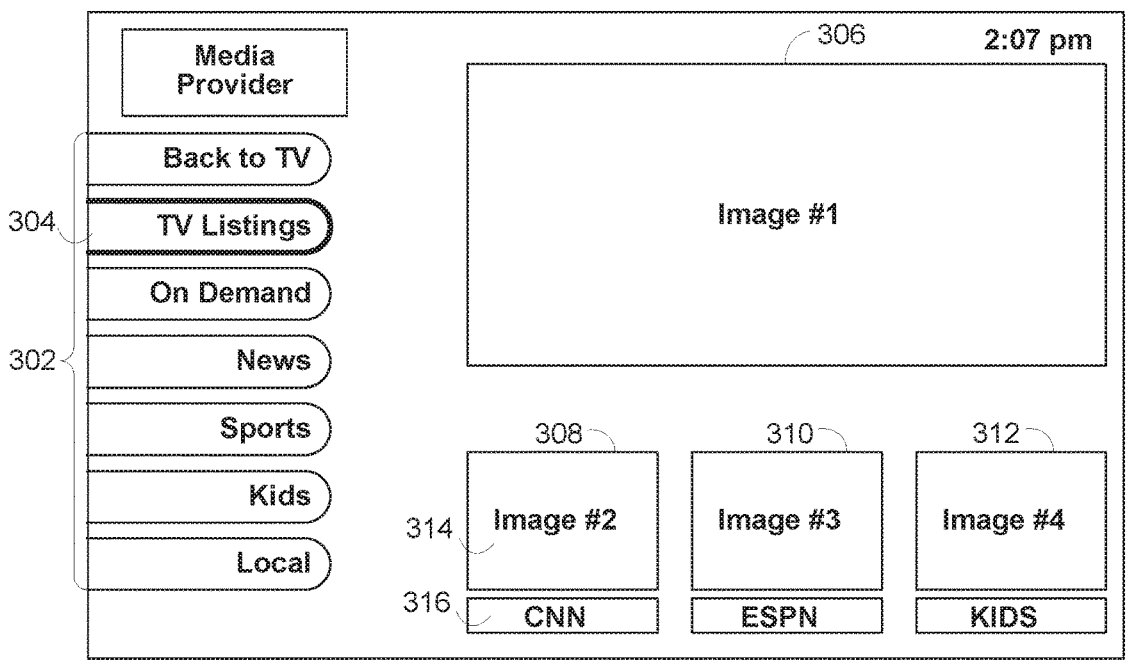
FIG. 3 shows another illustrative embodiment of a display screen that may be used to provide media guidance application listings, in accordance with some embodiments of the disclosure.

FIGS. 2-3 show illustrative display screens that may be used to provide media guidance data. The display screens shown in FIGS. 2-3 may be implemented on any suitable user equipment device or platform. While the displays of FIGS. 2-3 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 2 shows illustrative grid of a program listings display 200 arranged by time and channel that also enables access to different types of content in a single display. Display 200 may include grid 202 with (1) a column of channel/content type identifiers 204, where, each channel/content type identifier (which is a cell in the column) identifies a different channel or content type available; and (2) a row of time identifiers 206, where each time identifier (which is a cell in the row) identifies a time block of programming. Grid 202 also includes cells of program listings, such as program listing 208, where each listing provides the title of the program provided on the listing's associated channel and time. With a user input device, a user can select program listings by moving highlight region 210. Information relating to the program listing selected by highlight region 210 may be provided in program information region 212. Region 212 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies, or any other content provided by a particular content provider (e.g., HBO On Demand providing "The Sopranos" and "Curb Your Enthusiasm"). HBO ON DEMAND is a service mark owned by Time Warner Company L. P. et al. and THE SOPRANOS and CURB YOUR ENTHUSIASM are trademarks owned by the Home Box Office, Inc. Internet content may include web events, such as a, chat session or Webcast, or content available on-demand as streaming content or downloadable content through an Internet web site or other Internet access (e.g. FTP).

Grid 202 may provide media guidance data for non-linear programming including on-demand listing 214, recorded content listing 216, and Internet content listing 218. A display combining media guidance data for content from different types of content sources is sometimes referred to as a "mixed-media" display. Various permutations of the types of media guidance data that may be displayed that are different than display 200 may be based on user selection or guidance application definition (e.g., a display of only recorded and broadcast listings, only on-demand and broadcast listings, etc.). As illustrated, listings 214, 216, and 218 are shown as spanning the entire time block displayed in grid 202 to indicate that selection of these listings may provide access to a display dedicated to on-demand listings, recorded listings, or Internet listings, respectively. In some embodiments, listings for these content types may be included directly in grid 202. Additional media guidance data may be displayed in response to the user selecting one of the navigational icons 220. (Pressing an arrow key on a user input device may affect the display in a similar manner as selecting navigational icons 220.)

Display 200 may also include video region 222, and options region 226. Video region 222 may allow the user to view and/or preview programs that are currently available, will be available, or were available to the user. The content of video region 222 may correspond to, or be independent from, one of the listings displayed in grid 202. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Options region 226 may allow the user to access different types of content, media guidance application displays, and/or media guidance application features. Options region 226 may be part of display 200 (and other display screens described herein), or may be invoked by a user by selecting an on-screen option or pressing a dedicated or assignable button on a user input device. The selectable options within options region 226 may concern features related to program listings in grid 202 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 5. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference0 herein in their entireties.

Another display arrangement for providing media guidance is, shown in FIG. 3. Video mosaic display 300 includes, selectable options 302 for content information organized based on content type, genre, and/or other organization criteria. In display 300, television listings option 304 is selected, thus providing listings 306, 308, 310, and 312 as broadcast program listings. In display 300 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 308 may include more than one portion, including media portion 314 and text portion 316. Media portion 314 and/or text portion 316 may be selectable to view content in full-screen or to view information related to the content displayed in Media portion 314 (e.g., to view listings for the channel that the video is displayed on).

The listings in display 300 are of different sizes (i.e., listing 306 is larger than listings 308, 310, and 312), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 4:
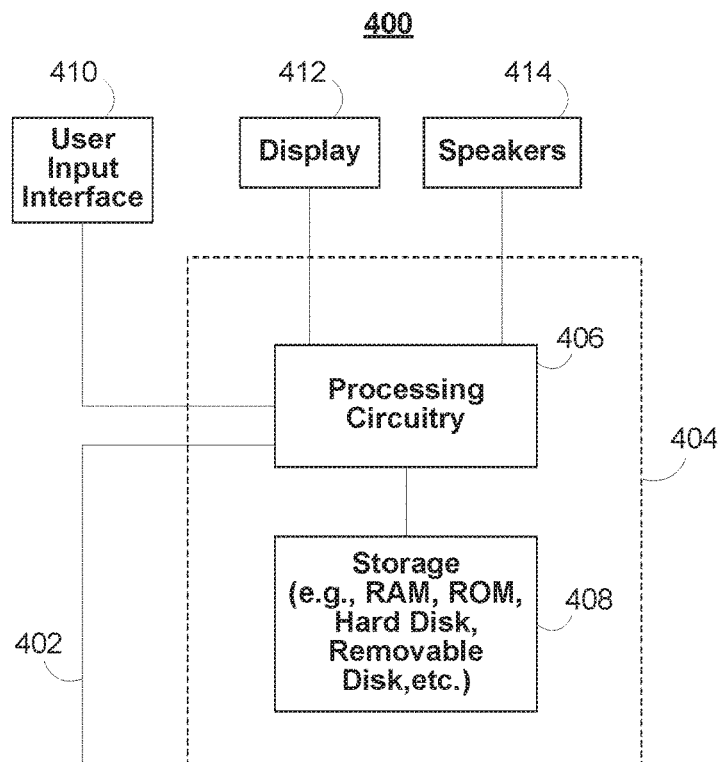
FIG. 4 is a block diagram of an illustrative user equipment (UE) device in accordance with some embodiments of the disclosure.

Users may access content and the media guidance application (and its display screens described above and below) from one or more of their user equipment devices. FIG. 4 shows a generalized embodiment of illustrative user equipment device 400. More specific implementations of user equipment devices are discussed below in connection with FIG. 5. User equipment device 400 may receive content and data via input/output (hereinafter "I/O") path 402. I/O path 402 may provide content (e.g., broadcast programming, on-demand programming, Internet content, content available over a local area network (LAN) or wide area network (WAN), and/or other content) and data to control circuitry 404, which includes processing circuitry 406 and storage 408. Control circuitry 404 may be used to send and receive commands, requests, and other suitable data using I/O path 402. I/O path 402 may connect control circuitry 404 (and specifically processing circuitry 406) to one or more communications paths (described below). I/O functions may be provided by one or more of these communications paths, but are shown as a single path in FIG. 4 to avoid overcomplicating the drawing.

Control circuitry 404 may be based on any suitable processing circuitry such as processing circuitry 406. As referred to herein, processing circuitry should be understood to mean circuitry based on one or more microprocessors, microcontrollers, digital signal processors, programmable logic devices, field-programmable-gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 404 executes instructions for a media guidance application stored in memory (i.e., storage 408). Specifically, control circuitry 404 may be instructed by the media guidance application to perform the functions discussed above and below. For example, the media guidance application may provide instructions to control circuitry 404 to generate the media guidance displays. In some implementations, any action performed by control circuitry 404 may be based on instructions received from the media guidance application.

In client-server based embodiments, control circuitry 404 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 5). In addition, communications circuitry may include circuitry that enables peer-to-peer communication of user equipment devices, or communication of user equipment devices in locations remote from each other (described in more detail below).

Memory may be an electronic storage device provided as storage 408 that is part of control circuitry 404. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 408 may be used to store various types of content described herein as well as media guidance data described above. Nonvolatile memory may also be used (e.g., to launch a boot-up routine and other instructions). Cloud-based storage, described in relation to FIG. 5, may be used to supplement storage 408 or instead, of storage 408.

Control circuitry 404 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 404 may also include scaler circuitry for upconverting and downconverting content into the preferred output format of the user equipment 400. Circuitry 404 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). It storage 408 is provided as a separate device from user equipment 400, the tuning and encoding circuitry (including multiple tuners) may be associated with storage 408.

A user may send instructions to control circuitry 404 using user input interface 410. User input interface 410 may be any suitable user interface, such as a remote control, mouse, trackball, keypad, keyboard, touch screen, touchpad, stylus input, joystick, voice recognition interface, or other user-input interfaces. Display 412 may be provided as a stand-alone device or integrated with other elements of user equipment device 400. For example, display 412 may be a touchscreen or touch-sensitive display. In such circumstances, user input interface 410 may be integrated with or combined with display 412. Display 412 may be one or more of a monitor, a television, liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 412 may be HDTV-capable. In some embodiments, display 412 may be a 3D display, and the interactive media guidance application and any suitable content may be displayed in 3D. A video card or graphics card may generate the output to the display 412. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 404. The video card may be integrated with the control circuitry 404. Speakers 414 may be provided as integrated with other elements of user equipment device 400 or may be stand-alone units. The audio component of videos and other content displayed on display 412 may be played through speakers 414. In some embodiments, the audio may be distributed to a receiver (not shown), which processes and outputs the audio via speakers 414.

The guidance application may be implemented using any suitable architecture. For example, it may be a stand-alone application wholly-implemented on user equipment device 400. In such an approach, instructions of the application are stored locally (e.g., in storage 408), and data for use by the application is downloaded on a periodic basis (e.g., from an out-of-band feed, from an Internet resource, or using another suitable approach). Control circuitry 404 may retrieve instructions of the application from storage 408 and process the instructions to generate any of the displays discussed herein. Based on the processed instructions, control circuitry 404 may determine what action to perform when input is received from input interface 410. For example, movement of a cursor on a display up/down may be indicated by the processed instructions when input interface 410 indicates that an up/down button was selected.

In some, embodiments, the media guidance application is a client-server based application. Data for use by a thick or thin client implemented on user equipment device 400 is retrieved on-demand by issuing requests to a server remote to the user equipment device 400. In one example of a client-server based guidance application, control circuitry 404 runs a web browser that interprets web pages provided by a remote server. For example, the remote server may store the instructions for the application in a storage device. The remote server may process the stored instructions using circuitry (e.g., control circuitry 404) and generate the displays discussed above and below. The client device may receive the displays generated by the remote server and may display the content of the displays locally on equipment device 400. This way, the processing of the instructions is performed remotely by the server while the resulting displays are provided locally on equipment device 400. Equipment device 400 may receive inputs from the user via input interface 410 and transmit those inputs to the remote server for processing and generating the corresponding displays. For example, equipment device 400 may transmit a communication to the remote server indicating that an up/down button was selected via input interface 410. The remote server may process instructions in accordance with that input and generate a display of the application corresponding to the input (e.g., a display that moves a cursor up/down). The generated display is then transmitted to equipment device 400 for presentation to the user.

In Some embodiments, the media guidance application is downloaded and interpreted or otherwise run by an interpreter or virtual machine (run by control circuitry 404). In some embodiments, the guidance application may be encoded in the ETV Binary Interchange Format (EBIF), received by control circuitry 404 as part of a suitable feed, and interpreted by a user agent running on control circuitry 404. For example, the guidance application may be an EBIF application. In some embodiments, the guidance application may be defined by a series, of JAVA-based files that are, received and run by a local virtual machine or other suitable middleware executed by control circuitry 404. In some of such embodiments (e.g., those employing MPEG-2 or other digital media encoding schemes), the guidance application may be, for example, encoded and transmitted in an MPEG-2 object carousel with the MPEG audio and video packets of a program.

Figure 5:
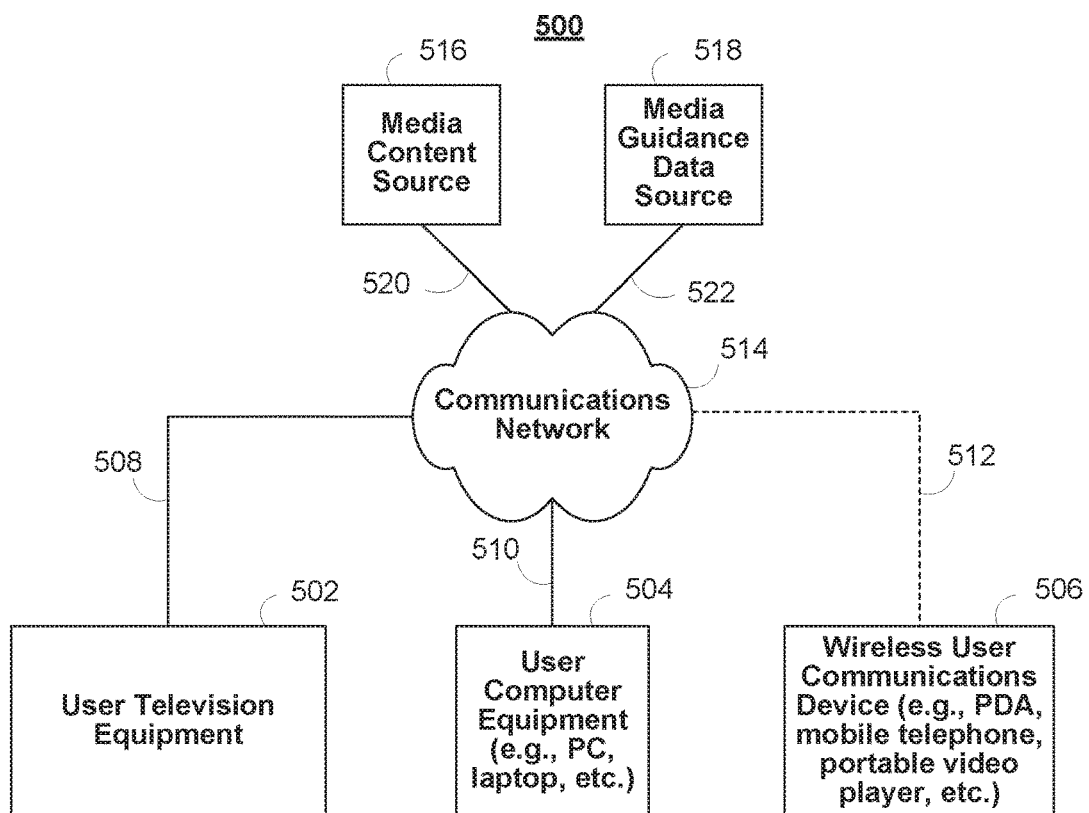
FIG. 5 is a block diagram of an illustrative media system in accordance with some embodiments of the disclosure.

User equipment device 400 of FIG. 4 can be implemented in system 500 of FIG. 5 as user television equipment 502, user computer equipment 504, wireless user communications device 506, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 4 may pot be classified solely as user television equipment 502, user computer equipment 504, or a wireless user communications device 506. For example, user television equipment 502 may, like some user computer equipment 504, be Internet-enabled allowing for access to Internet content, while user computer equipment 504 may, like some television equipment 502, include a tuner allowing for access to television programming. The media guidance application may have the same layout on various different types of user equipment or may be tailored to the display capabilities of the user equipment. For example, on user computer equipment 504, the guidance application may be provided as a web site accessed by a web browser. In another example, the guidance application may be scaled down for wireless user communications devices 506.

In system 500, there is typically more than one of each type of user equipment device but only one of each is shown in FIG. 5 to avoid overcomplicating the drawing. In addition, each user may utilize more than one type of user equipment device and also more than one of each type of user equipment device.

In some embodiments, a user equipment device (e.g., user television equipment 502, user computer equipment 504, wireless user communications device 506) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 514. Namely, user television equipment 502, user computer equipment 504, and wireless user communications device 506 are coupled to communications network 514 via communications paths 508, 510, and 512, respectively. Communications network 514 may be one or more networks including the Internet, a mobile phone network, mobile voice or data network (e.g., a 4G or LTE network), cable network, public switched telephone network, or other types of communications network or combinations of communications networks. Paths 508, 510, and 512 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 512 is drawn with dotted lines to indicate that in the exemplary embodiment shown in FIG. 5 it is a wireless path and paths 508 and 510 are drawn as solid lines to indicate they are wired paths (although these paths may be wireless paths, if desired). Communications with the user equipment devices may be provided by one or more of these communications paths, but are shown as a single path in FIG. 5 to avoid overcomplicating the drawing.

Although communications paths are not drawn between user equipment devices, these devices may communicate directly with each other via communication paths, such as those described above in connection with paths 508, 510, and 512, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 514.

System 500 includes content source 516 and media guidance data source 518 coupled to communications network 514 via communication paths 520 and 522, respectively. Paths 520 and 522 may include any of the communication paths described above in connection with paths 508, 510, and 512.

Communications with the content source 516 and media guidance data source 518 may be exchanged over one or more communications paths, but are shown as a single path in FIG. 5 to avoid overcomplicating the drawing. In addition, there may be more than one of each content source 516 and media guidance data source 518, but only one of each is shown in FIG. 5 to avoid overcomplicating the drawing. (The different types of each of these sources are discussed below.) If desired, content source 516 and media guidance data source 518 may be integrated as one source device. Although communications between sources 516 and 518 with user equipment devices 502, 504, and 506 are shown as through communications network 514, in some embodiments, sources 516 and 518 may communicate directly with user equipment devices 502, 504, and 506 via communication paths (not shown) such as those described above in connection with paths 508, 510, and 512.

Content source 516 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 516 may be the originator of content (e.g., a television broadcaster, a Webcast provider, etc.) or may not be the originator of content (e.g., an on-demand content provider, an Internet provider of content of broadcast programs for downloading, etc.). Content source 516 may include cable sources, satellite providers, on-demand providers, Internet providers, over-the-top content providers, or other providers of content. Content source 516 may also include a remote media server used to store different types of Content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 518 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 518 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 518 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 518 may provide user equipment devices 502, 504, and 506 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicate a likelihood of whether the given user will terminate access to a particular service or Source. In particular, a higher score may indicate a higher level of confidence that the user will terminate access to a particular service or source. Based on the score, the media guidance application may generate promotions that entice the user to keep the particular service or source indicated by the score as One to which the user will likely terminate access.

Media guidance applications may be, for example, stand-alone applications implemented on user equipment devices. For example, the media guidance application may be implemented as software or a set of executable instructions which may be stored in storage 408, and executed by control circuitry 404 of a user equipment device 400. In some embodiments, media guidance applications may be client-server applications, where only a client application resides on the user equipment device, and server application resides on a remote server. For example, media guidance applications may be implemented partially as a client application on control circuitry 404 of user equipment device 400 and partially on a remote server as a server application (e.g., media guidance data source 518) running on control circuitry of the remote server. When executed by control circuitry of the remote server (such as media guidance data source 518), the media guidance application may instruct the control circuitry to generate the guidance application displays and transmit the generated displays to the user equipment devices. The server application may instruct the control circuitry of the media guidance data source 518 to transmit data for storage on the user equipment. The client application may instruct control circuitry of the receiving user equipment to generate the guidance application displays.

Content and/or media guidance data delivered to user equipment devices 502, 504, and 506 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the User equipment device.

Media guidance system 500 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 5.

In one approach, user equipment devices may communicate with each other within a home network. User equipment devices can communicate with each other directly via short-range point-to-point communication schemes described above, via indirect paths through a hub or other similar device provided on a home network, or via communications network 514. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 516 to access content. Specifically, within a home, users of user television equipment 502 and user computer equipment 504 may access the media guidance application to navigate among and locate desirable content. Users may also access the media guidance application outside of the home using wireless user communications devices 506 to navigate among and locate desirable content.

In a fourth approach, user equipment devices may operate in a cloud computing environment to access cloud services. In a cloud computing environment, various types of computing services for content sharing, storage or distribution (e.g., video sharing Sites or social networking sites) are provided by a collection of network-accessible computing and storage resources, referred to as "the cloud." For example, the cloud can include a collection of server computing devices, which may be located centrally or at distributed locations, that provide cloud-based services to various types of users, and devices connected via a network such as the Internet via communications network 514. These cloud resources may include one or more content sources 516 and one or more media guidance data sources 518. In addition or in the alternative, the remote computing sites may include other user equipment devices, such as user television equipment 502, user computer equipment 504, and wireless user communications device 506. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by Others on connected devices. These cloud-based services may allow a user equipment device to store content to the cloud and to receive content from the cloud rather than storing content locally and accessing locally-stored content.

A user may use various content capture devices, such as, camcorders, digital cameras with video mode, audio recorders, mobile phones, and handheld computing devices, to record content. The user can upload content to a content storage service on the cloud either directly, for example, from user computer equipment 504 or wireless user communications device 506 having content capture feature. Alternatively, the user can first transfer the content to a user equipment device, such as user computer equipment 504. The user equipment device storing the content uploads the content to the cloud using a data transmission service on communications network 514. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 4.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

Figure 6:
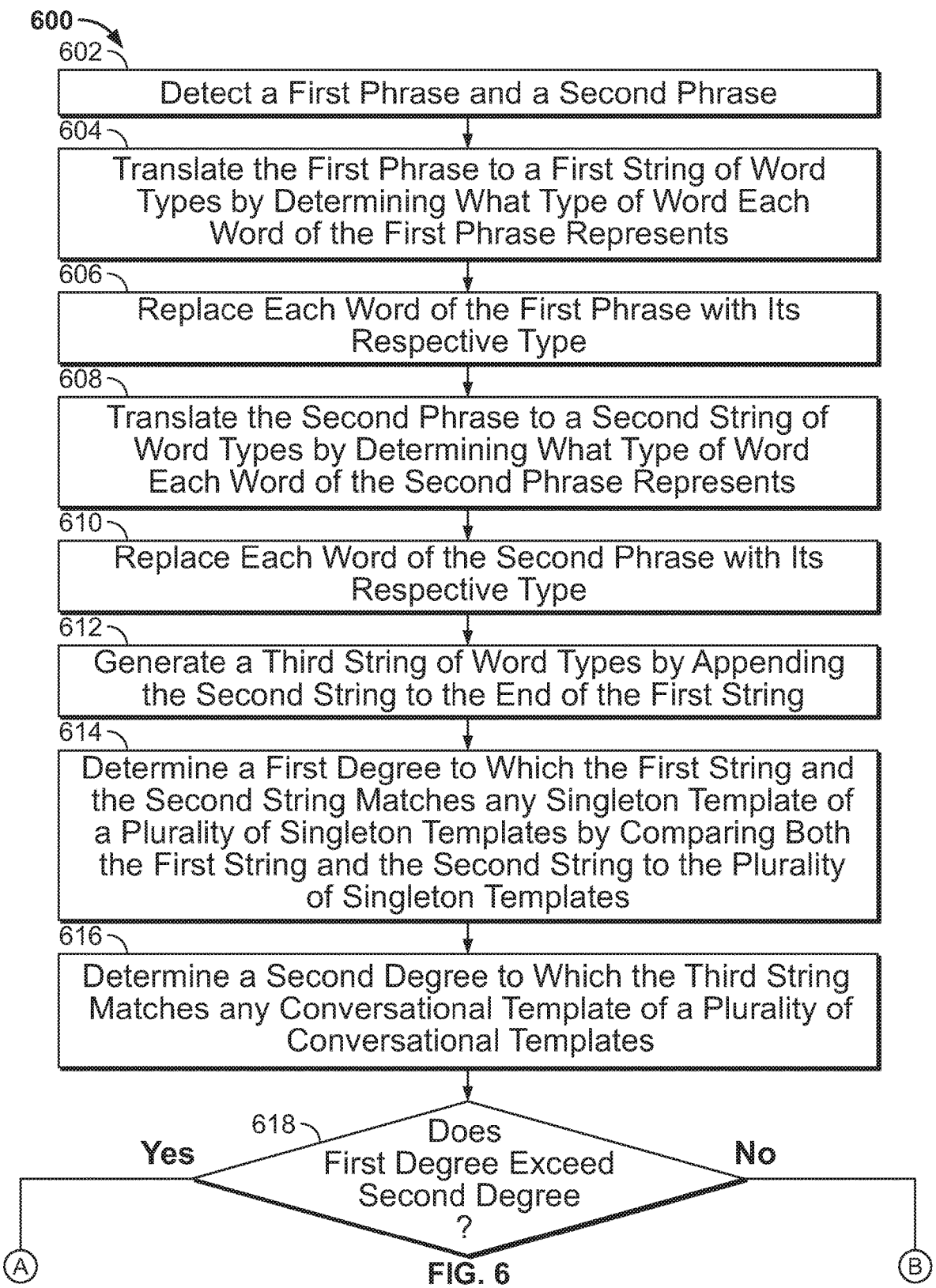
FIG. 6 is a flowchart of illustrative steps involved in determining whether two separate commands are part of a same conversation, or are isolated, individual commands, in accordance with some embodiments of the disclosure.
Figure 6:
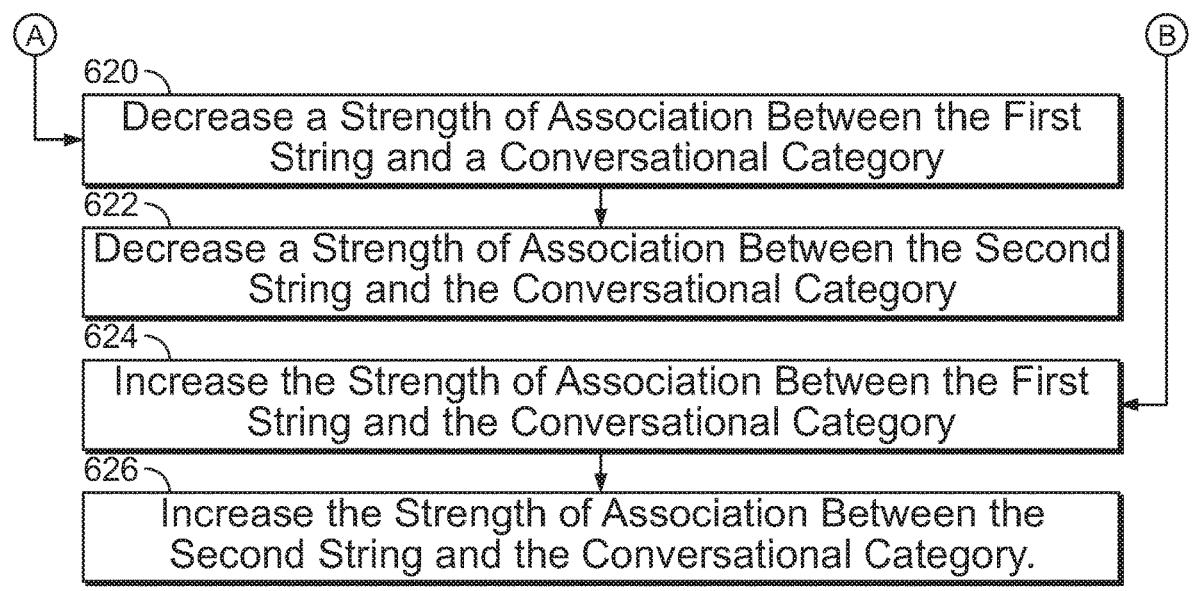

FIG. 6 is a flowchart of illustrative steps involved in determining whether two separate commands are part of a same conversation, or are isolated, individual commands, in accordance with some embodiments of the disclosure. Process 600 begins at 602, where the media guidance application may detect a first phrase and a second phrase. The first phrase may be first phrase 104, and the second phrase may be second phrase 106.

The media guidance application may be executed by control circuitry 404 of user equipment 100. User equipment 100 may include any capability described with respect to user equipment 502, 504, and/or 506. The media guidance application may detect the phrases by way of user input interface 410 (which is depicted for convenience in FIG. 1 as microphone 102, but may be any user input interface 410). For example, as depicted in FIG. 1, the media guidance application may detect that a user has uttered "Show me action movies" and may also detect that a user has uttered "with Tom Cruise."

Process 600 may continue to 604, where the media guidance application may translate first phrase 104 to a first string of word types by determining what type of word each word, of first phrase 104 represents. As described above and below, the media guidance application may perform this translation by consulting a database, such as media guidance data source 518. The database, may be stored local to user equipment 100 (e.g., on storage 408) or remote to user equipment 100 (e.g., on media guidance data source 518, which may be accessed by way of communications network 514).

Process 600 may continue, to 606, where the media guidance application may replace each word of first phrase 104 with its respective type For example, if first phrase 104 is the phrase "Show me action movies," consistent with the above and below, the media guidance application may translate first phrase 104 to 'command' 'genre' 'media category.' Process 600 may continue to 608 and 610, where steps similar to 604 and 606 are performed in the same manner on second phrase 106 instead of first phrase 104, thus resulting in a translation of both first phrase 104 and second phrase 106 into first and second strings of word types, respectively.

Process 600 may then continue to 612, where the media guidance application may generate a third string of word types by appending the second string to the end of the first string. For example, if the first string of word types is 'command' 'genre' 'media category,' and the second string of word types is 'transitional word' 'crew,' then the third string would be the following: 'command' 'genre' 'media category' 'transitional word' 'crew.'

Process 600 may then continue to 614, where the media guidance application may determine a first degree to which the first string and the second string matches any singleton template of a plurality of singleton templates by comparing both the first string and the second string to the plurality of singleton templates. For example, as described above and below, the media guidance application may determine the likelihood that either or both of the first and second strings are stand-alone commands that do not depend on one another.

Process 600 may then continue to 616, where the media guidance application may determine a second degree to which the third string matches any conversational template of a plurality of conversational templates. This may be performed in any manner described above and below. For example, the media guidance application may determine the likelihood that the first and second strings, as combined, are intended to form a single search string.

Process 600 may then continue to 618, where it is determined whether the first degree exceeds the second degree. If the first degree does exceed the second degree, process 600 may continue to 620, where the media guidance application may decrease a strength of association between the first string and a conversational category, thus noting that the first string is likely an isolated search command that does not depend on another string. Process 600 may then continue to 622, where the media guidance application may similarly decrease a strength of association between the second string and the conversational category.

If, at 618, it is determined that the first degree does not exceed the second degree, process 600 may continue from 618 to 622, where the media guidance application may increase the strength of association between the first string and the conversational category, thus noting that the first string is likely a combined search command that depends on another string. Process 600 may then continue to 624, where the media guidance application may similarly increase the strength of association between the second string and the conversational category.

Figure 7:
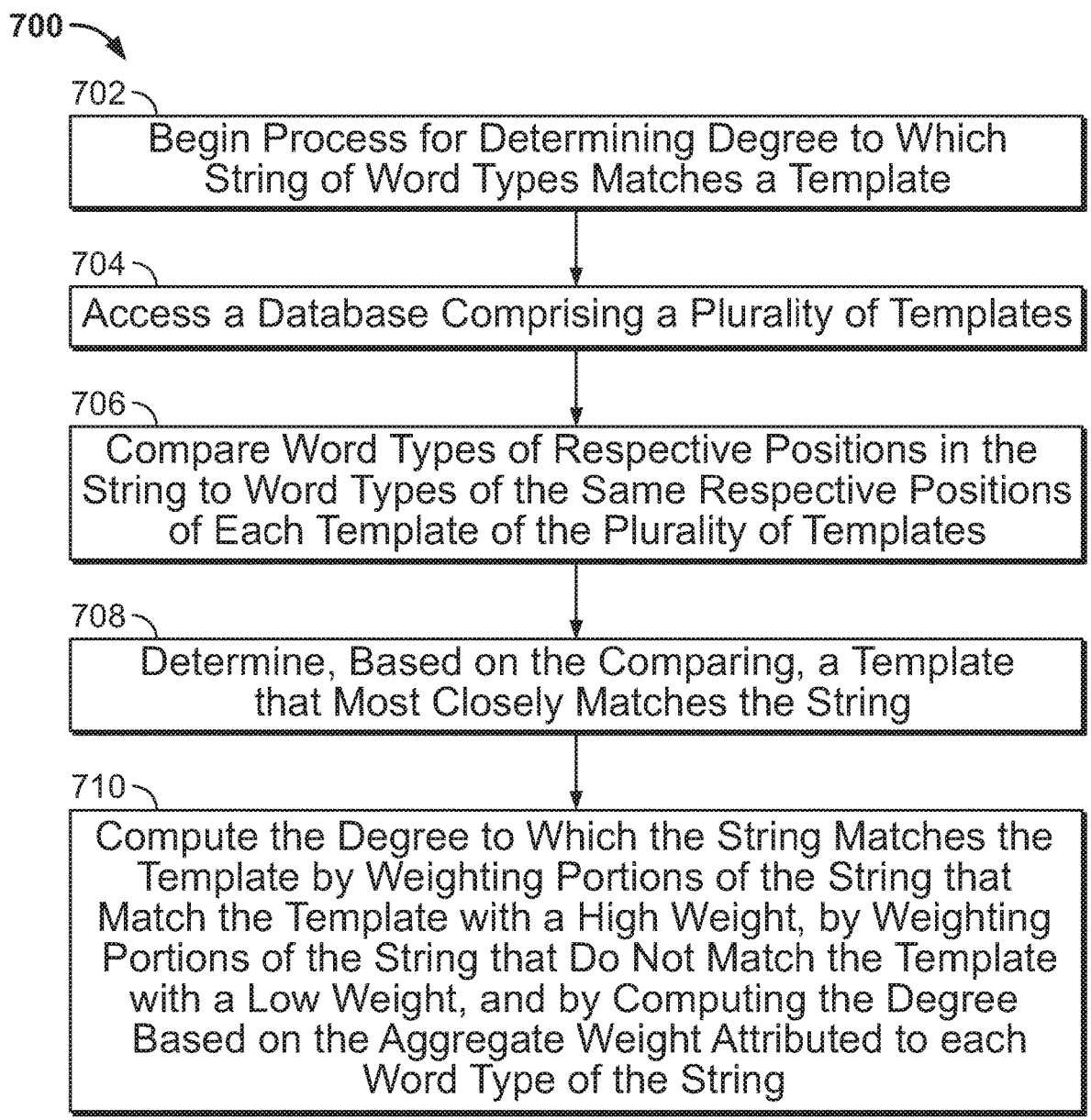
FIG. 7 is a flowchart of illustrative steps involved in determining a degree to which a string of word types matches a template, in accordance with some embodiments of the disclosure.

FIG. 7 is a flowchart of illustrative steps involved in determining a degree to which a string of word types matches a template, in accordance with some embodiments of the disclosure. Process 700 begins at 702, where the media guidance application may begin a process for determining a degree to which a string of word types matches a template. For example, process 700 may be a subroutine to accomplish 614 or 616 of FIG. 6.

Process 700 may continue to 704, where the media guidance application may access a database comprising a plurality of templates. For example, the media guidance application may access media guidance data source 518 by way of communications network 414. Media guidance data source 518 may include entries of a plurality of templates, such as the singleton and conversational templates described above.

Process 700 may continue to 706, where the media guidance application may compare word types of respective positions in the string to word types of the same respective positons of each template of the plurality of templates. Drawing from the examples above, if the string of word types is 'command' 'genre' 'media category,' and a template also is 'command' 'genre' 'media category,' then the comparison would yield a match for each word type. If, however, the template was 'command' 'genre' 'media category' 'sub-command,' then only a partial match would be yielded for the comparison because 'sub-command' is not within the string of word types. The comparisons may indicate how close of a match each comparison yields by scoring the match. For example, in the second example of this paragraph, a score of 75% may be attributed because three of the four words of the template are within the string of word types. Any form of logic or fuzzy logic may be used to calculate the scores.

Process 700 may continue to 708, where the media guidance application may determine, based on the comparing, a template that most closely matches the string. For example, after comparing the string of word types to each template of the plurality of templates, a closest match may be determined. The closest match may be the match with the highest score, as described above.

Process 700 may continue to 710, where the media guidance application may compute the degree to which the string matches the template by weighting portions of the string that match the template with a high weight, by weighting portions of the string that do not match the template with a low weight, and by Computing the degree based on the aggregate weight attributed to each word type of the string. For example, after a closest template is determined, the degree to which the string of word types matches the closest template may be computed. This may be done in a manner similar to the scoring mechanism described with respect to 706 and 708.

Figure 8:
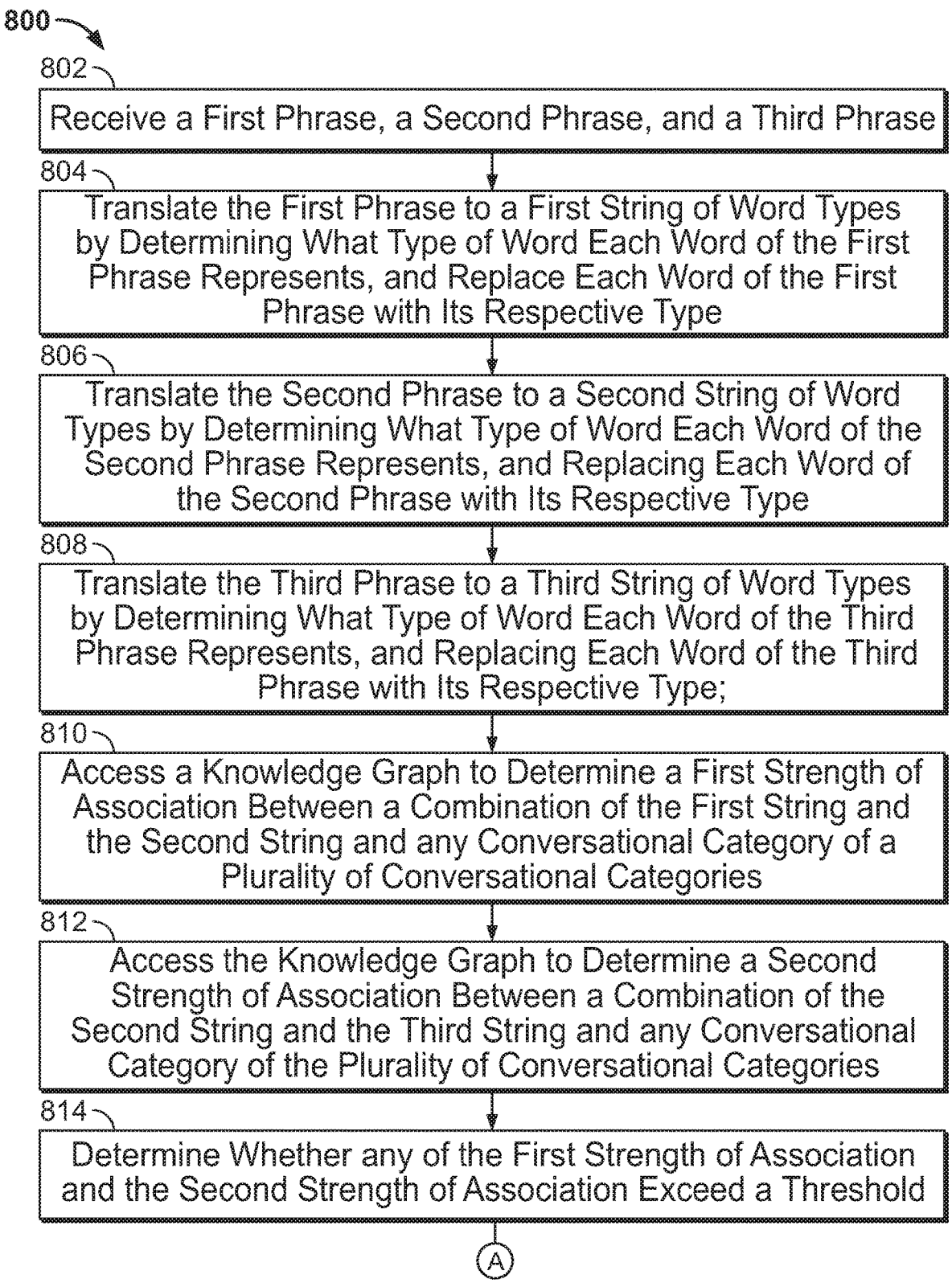
FIG. 8 is a flow chart of illustrative steps involved in determining whether separate commands are part of a single conversation, based on information of a knowledge graph, in accordance with some embodiments of the disclosure.
Figure 8:
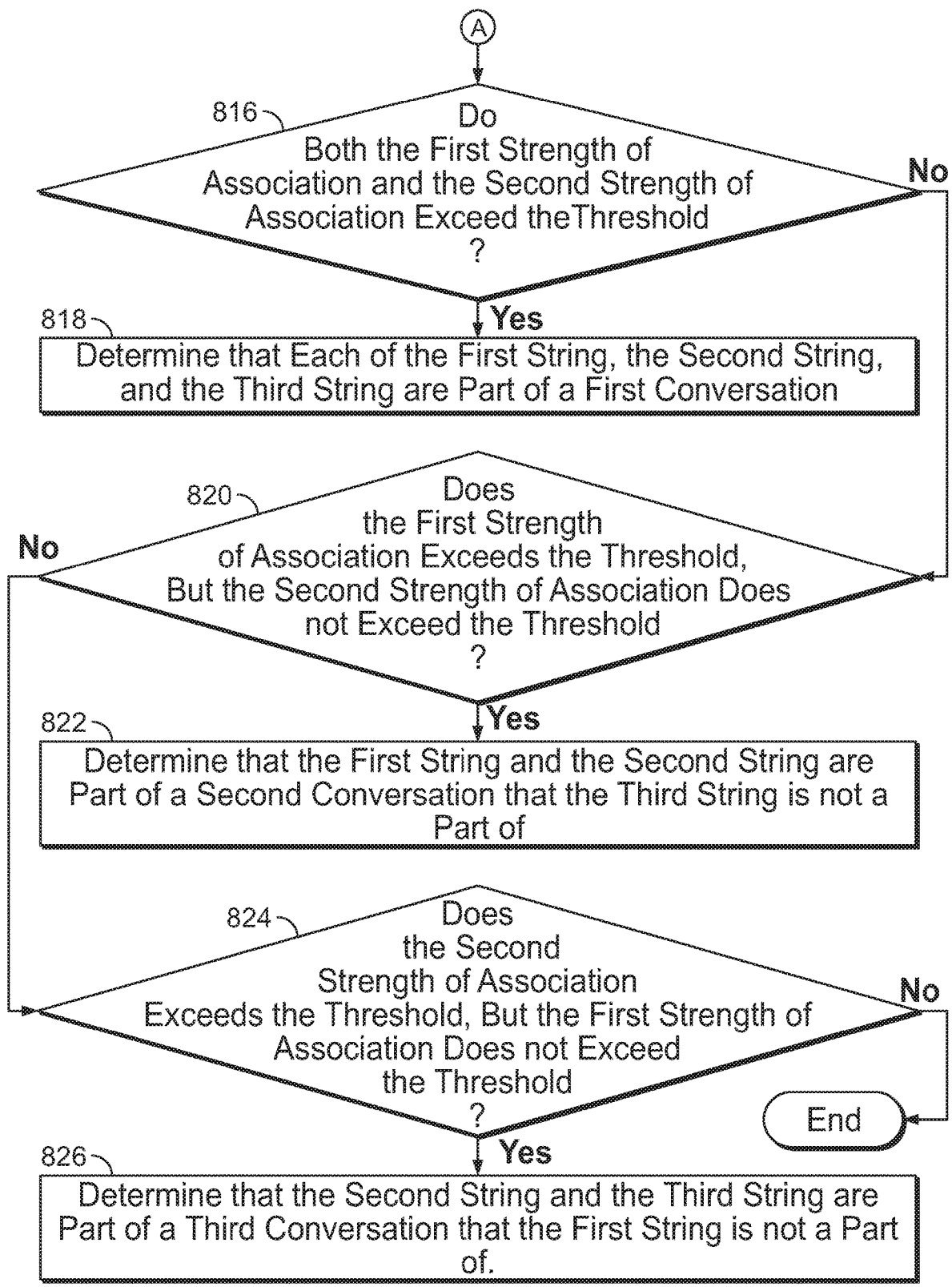

FIG. 8 is a flow chart of illustrative steps involved in determining whether separate commands are part of a single conversation, based on information of a knowledge graph, in accordance with some embodiments of the disclosure. Process 800 begins at 802, where the media guidance application may receive a first phrase, a second phrase, and a third phrase. For example, the first phrase may be first phrase 104 of "Show me action movies," the second phrase may be second phrase 106 of "with Tom Cruise," and the third phrase may say "and Paula Patton."

At 804, the media guidance application may translate the first phrase to a first string of word types by determining what type of word each word of the first phrase represents, and by replacing each word of the first phrase with its respective type. This may occur in any manner described above and below. As described above, translating first phrase 104 may result in 'command' 'genre' 'media category.'

At 806, the media guidance application may translate the second phrase to a second string of word types by determining what type of word each word of the Second phrase represents, and by replacing each word of the second phrase with its respective type. This may occur in any manner described above or below. As an example, second phrase 106 may be translated to 'transitional word' 'crew.'

At 808, the media guidance application may translate the third phrase to a third string of word types by determining what type of word each word of the third phrase represents, and by replacing each word of the third phrase with its respective type. This may occur in any manner described above or below. As an example, the third phrase may be translated to 'transitional word' 'crew.'

At 810, the media guidance application may access a knowledge graph to determine a first strength of association between a combination of the first string and the second string and any conversational category of a plurality of conversational categories. The knowledge graph may be located at media guidance data source 518, and may be accessed by way of communications network 514. The strength of association may be determined by combining the first string and the second string, and transmitting a query to the knowledge graph to learn of a strength of association stored in the knowledge graph of the combined first and second string with any conversational category of the knowledge graph. For example, each conversational category may have an entry, and each such entry may contain a data structure that indicates strengths of associations with various strings. The strength of association called for here may be learned from such a data structure.

At 812, the media guidance application may access the knowledge graph to determine a second strength of association between a combination of the second string and the third string and any conversational category of the plurality of conversational categories. The same operations described with respect to 810 apply to 812.

At 814, the media guidance application may determine whether any of the first strength of association and the second strength of association equal or exceed a threshold. This may involve a numerical comparison of the first strength of association and/or the second strength of association to a threshold. The threshold is described above. At 816, the media guidance application may determine whether both the first strength and association and the second strength of association equal or exceed the threshold. If the determination is yes, process 800 may continue to 818; if the determination is no, process 800 may continua to 820.

At 818, the media guidance application may determine that each of the first string, the second string, and the third string are part of a first conversation. For example, the media guidance application may determine that each of "show me action Movies" "with Tom Cruise" and "with Paula Patton" forms one single query.

At 820, the media guidance application may determine whether the first strength of association exceeds, the threshold, but the second strength of association does not exceed the threshold. If the media guidance application determines that this is the case, process 800 may continue to 822; if the media guidance application determines, however, that this is not the case, process 800 may continue to 824. At 822, the media guidance application may determine that the first string and the second string are part of a second conversation that the third string is not a part of. For example, the media guidance application may determine that "Show me movies with Tom Cruise" is of a different conversation than the third string, which may say "Tell me the weather."

At 824, the media guidance application may determine whether the second strength of association, exceeds the threshold, but the first strength of association does not exceed the threshold. If the answer is in the affirmative, process 800 may continue to 826, where the media guidance application may determine that the second string and the third string are part of a third conversation that the first string is not a part of. If the answer is in the negative, process 800 may end.

It should be noted that processes 600-800 or any step thereof could be performed on, or provided by, any of the devices shown in FIGS. 1 and 4-5. For example, any of processes 600-800 may be executed by control circuitry 404 (FIG. 4) as instructed by control circuitry implemented on user equipment 502, 504, and/or 506 (FIG. 5) in order to ensure media borrowed by a user is returned to its rightful owner. In addition, one or more steps of processes 600-800 may be incorporated into, or combined with one or more steps of any other process or embodiment.

It is contemplated that the steps or descriptions of each of FIGS. 6-8 may be used with any other embodiment of this disclosure. In addition, the steps and descriptions described in relation to FIGS. 6-8 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 1 and 4-5 could be used to perform one or more of the steps in FIGS. 6-8.

It will be apparent to those of ordinary skill in the art that methods involved in the present invention may be embodied, in a computer program product that includes a computer-usable and/or readable medium. For example, such a computer-usable medium may consist of a read-only memory device, such as a CD-ROM disk or conventional ROM device, or a random access memory, such as a hard drive device or a computer diskette, having a computer-readable program code stored thereon. It should also be understood that methods, techniques, and processes involved in the present invention may be executed using processing circuitry. For instance, determining whether an estimated time of arrival precedes a broadcast time of a preferred program may be performed, e.g., by processing circuitry 406 of FIG. 4. The processing circuitry, for instance, may be a general purpose processor, a customized integrated circuit (e.g., an ASIC), or a field-programmable gate array (FPGA) within user equipment 400, media content source 516, or media guidance data source 518. For example, a user profile, as described herein, may be stored in, and retrieved from, storage 408 of FIG. 4, or media guidance data source 518 of FIG. 5. Furthermore, processing circuitry, or a computer program, may update settings associated with a user, such as a register of media assets stored on a user's user equipment, updating the information stored within storage 408 of FIG. 4 or media guidance data source 518 of FIG. 5.

The processes discussed above are intended, to be illustrative and not limiting. One skilled in the art would appreciate that the steps, of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations-described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

What is claimed is:

1. A method for training a processor-executed data model to accurately determine whether two phrases are conversationally connected, the method comprising:

generating a first string of word types based on a first phrase and a second string of word types based on a second phrase;

generating a third string of word types by appending the second string of word types to the end of the first string of word types;

determining a first degree of matching based on (1) comparing the first string of word types with a first singleton template and (2) comparing the second string of word types with a second singleton template;

determine a second degree of matching based on comparing the third string of word types with a conversational category;

determining whether the first degree of matching exceeds the second degree of matching; and in response to determining that the first degree of matching exceeds the second degree of matching, decreasing, in a graph of related entities stored in a database, a first strength of association between the first string of word types and the conversational category by a pre-defined amount; and in response to determining that the first degree of matching does not exceed the second degree of matching, increasing, in the graph of related entities stored in the database, the first strength of association between the first string of word types and the conversational category by the pre-defined amount.

2. The method of claim 1, further comprising:

retrieving expected importance levels of word types;

determining a respective expected importance level for each word type of the first string of word types; and identifying a predominant word type based on a highest determined respective expected importance level corresponding to a respective word type of the first string of word types.

3. The method of claim 2, further comprising:

determining, based on the predominant word type of the first string of word types, a string type; and increasing a strength of association of the first string of word types with the string type, wherein the conversational category is associated with the string type.

4. The method of claim 1, wherein each singleton template represents a template of word types that represent a valid search query that requires no further input to be executed.

5. The method of claim 1, wherein the second phrase is detected subsequent to a time at which the first phrase is detected, and wherein determining a first degree of matching comprises:

determining whether a word type of a first word of the second string of word types is of a transitional type; and in response to determining that the word type of the first word of the second string of word types is of the transitional type, decreasing the first degree of matching.

6. The method of claim 5, further comprising increasing the second degree of matching in response to determining that the word type of the first word of the second string is of the transitional type.

7. The method of claim 5, wherein the pre-defined amount is a first pre-defined amount, further comprising, in response to determining that the first degree of matching does not exceed the second degree of matching, modifying a second strength of association between the second string of word types and the conversational category by a second pre-defined amount.

8. The method of claim 1, wherein generating the first string of word types based on the first phrase and the second string of word types based on the second phrase comprises:

extracting a word from either the first phrase or the second phrase;

comparing the word to entries of a database that indicates word types of known words;

determining whether a word type is known based on the comparing; and in response to determining that the word type is known, replacing the word with the word type indicated in an entry corresponding with the word.

9. The method of claim 8, further comprising, in response to determining that the word type is unknown:

comparing the word to entries of a dictionary database to determine a grammatical category of the word;

determine a high-level category corresponding to the word; and extrapolating a word type based on the grammatical category and the high-level category.

10. The method of claim 1, further comprising, in response to determining that the first degree of matching does not exceed the second degree of matching:

creating a combined phrase by combining the first phrase with the second phrase; and executing a search on the combined phrase.

11. A system for training a processor-executed data model to accurately determine whether two phrases are conversationally connected, the system comprising:

communications circuitry; and control circuitry configured to:

generate a first string of word types based on a first phrase and a second string of word types based on a second phrase;

generate a third string of word types by appending the second string of word types to the end of the first string of word types;

determine a first degree of matching based on (1) comparing the first string of word types with a first singleton template and (2) comparing the second string of word types with a second singleton template;

determine a second degree of matching based on comparing the third string of word types with a conversational category;

determine whether the first degree of matching exceeds the second degree of matching; and in response to determining that the first degree of matching exceeds the second degree of matching, decrease, in a graph of related entities stored in a database, a first strength of association between the first string of word types and the conversational category by a pre-defined amount; and in response to determining that the first degree of matching does not exceed the second degree of matching, increase, in the graph of related entities stored in the database, the first strength of association between the first string of word types and the conversational category by the pre-defined amount.

12. The system of claim 11, wherein the control circuitry is further configured to:

retrieve expected importance levels of word types;

determine a respective expected importance level for each word type of the first string of word types; and identify a predominant word type based on a highest determined respective expected importance level corresponding to a respective word type of the first string of word types.

13. The system of claim 12, wherein the control circuitry is further configured to:

determine, based on the predominant word type of the first string of word types, a string type; and increase a strength of association of the first string of word types with the string type, wherein the conversational category is associated with the string type.

14. The system of claim 11, wherein each singleton template represents a template of word types that represent a valid search query that requires no further input to be executed.

15. The system of claim 11, wherein the second phrase is detected subsequent to a time at which the first phrase is detected, and wherein the control circuitry is further configured to determine a first degree of matching by:

determining whether a word type of a first word of the second string of word types is of a transitional type; and in response to determining that the word type of the first word of the second string of word types is of the transitional type, decreasing the first degree of matching.

16. The system of claim 15, wherein the control circuitry is further configured to increase the second strength of association in response to determining that the word type of the first word of the second string is of the transitional type.

17. The system of claim 15, wherein a pre-defined amount is a first pre-defined amount, and wherein the control circuitry is further configured to, in response to determining that the first degree of matching does not exceed the second degree of matching, modify a second strength of association between the second string of word types and the conversational category by a second pre-defined amount.

18. The system of claim 11, wherein the control circuitry is further configured to generate the first string of word types based on the first phrase and the second string of word types based on the second phrase by:
- extracting a word from either the first phrase or the second phrase;
- comparing the word to entries of a database that indicates word types of known words;
- determining whether a word type is known based on the comparing; and
- in response to determining that the word type is known, replacing the word with the word type indicated in an entry corresponding with the word.

19. The system of claim 18, wherein the control circuitry is further configured, in response to determining that the word type is unknown, to:
- compare the word to entries of a dictionary database to determine a grammatical category of the word;
- determine a high-level category corresponding to the word; and
- extrapolate a word type based on the grammatical category and the high-level category.

20. The system of claim 11, wherein the control circuitry is further configured to, in response to determining that the first degree of matching does not exceed the second degree of matching:
- create a combined phrase by combining the first phrase with the second phrase; and
- execute a search on the combined phrase.

\* \* \* \* \*